(12) United States Patent
Young et al.

(10) Patent No.: US 10,773,484 B2
(45) Date of Patent: Sep. 15, 2020

(54) HINGED COMPOSITE SANDWICH PANELS

(71) Applicant: The Boeing Company, Chicago, IL (US)

(72) Inventors: Stephen M. Young, Mill Creek, WA (US); Jason Turner, Marysville, WA (US); Kevin G. Swanson, Seattle, WA (US); Duane M. Egging, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/887,898

(22) Filed: Feb. 2, 2018

(65) Prior Publication Data

US 2019/0240948 A1    Aug. 8, 2019

(51) Int. Cl.
| | |
|---|---|
| *B64C 1/14* | (2006.01) |
| *B32B 3/06* | (2006.01) |
| *B32B 3/12* | (2006.01) |
| *B32B 37/16* | (2006.01) |
| *B32B 38/00* | (2006.01) |
| *B64D 11/02* | (2006.01) |

(Continued)

(52) U.S. Cl.
CPC ............... *B32B 3/06* (2013.01); *B32B 3/12* (2013.01); *B32B 37/16* (2013.01); *B32B 38/0036* (2013.01); *B64C 1/1461* (2013.01); *B64D 11/02* (2013.01); *E06B 3/88* (2013.01); *B32B 2605/18* (2013.01); *E06B 2003/7051* (2013.01); *Y10T 428/24008* (2015.01)

(58) Field of Classification Search
CPC .......... Y10T 428/24008; B64C 1/1461; B64C 1/1407–1469; E06B 7/367; E05Y 2900/502

USPC ............................................................ 49/383
See application file for complete search history.

(56) References Cited

U.S. PATENT DOCUMENTS

| | | | | |
|---|---|---|---|---|
| 2,504,635 A | * | 4/1950 | Bradley ................. | E05D 11/00 16/223 |
| 2,559,087 A | | 7/1951 | Philipp | |

(Continued)

FOREIGN PATENT DOCUMENTS

| | | |
|---|---|---|
| DE | 29708001 U1 | 7/1997 |
| DE | 102011000258 B4 | 10/2012 |
| EP | 0939190 B1 | 12/2002 |

OTHER PUBLICATIONS

"Honeycomb Core—Regent and Omega," Ceco Door ASSA ABLOY, accessed Feb. 2, 2018, 4 pages. https://www.cecodoor.com/en/site/cecodoor/products/standard-fire-doors/honeycomb-core/.

(Continued)

*Primary Examiner* — Alexander S Thomas
(74) *Attorney, Agent, or Firm* — Yee & Associates, P.C.

(57) ABSTRACT

An apparatus comprises a composite sandwich panel, a seal, and a hinge. The composite sandwich panel has a first edge in a first over-crush edge region, wherein a thickness of the composite sandwich panel decreases within the first over-crush edge region in a direction towards the first edge. The seal is bonded to the first over-crush edge region of the composite sandwich panel and extending past the first edge. The hinge is connected to the composite sandwich panel such that an axis of rotation of the hinge is positioned over the first over-crush edge region of the composite sandwich panel.

20 Claims, 14 Drawing Sheets

(51) Int. Cl.
    *E06B 3/88*        (2006.01)
    *E06B 3/70*        (2006.01)

(56)         References Cited

U.S. PATENT DOCUMENTS 2,681,479  A  *   6/1954  Dixon, Sr. .............. E06B 7/367
                                                           49/383
    3,718,171  A  *   2/1973  Godwin ................ B64C 1/1415
                                                           160/188
    4,910,065  A      3/1990  Mckinney
    6,007,470  A     12/1999  Komarek et al.
    6,047,925  A  *   4/2000  Rivera .................... H01Q 1/28
                                                           244/129.4
    2002/0025404 A1   2/2002  Taber et al.
    2009/0095841 A1   4/2009  Eveker et al.
    2014/0291446 A1  10/2014  Reams et al.
    2016/1094068      8/2016  Savian et al.

OTHER PUBLICATIONS

Extended European Search Report, dated Jul. 11, 2019, regarding Application No. EP18248071.5, 7 pages.

\* cited by examiner

HINGED COMPOSITE SANDWICH PANELS

BACKGROUND INFORMATION

1. Field

The present disclosure relates generally to cabinetry doors and, more specifically, to forming cabinetry doors using composite sandwich panels.

2. Background

Today, cabinetry inside aircraft lavatories is typically formed of either injection-molded or thermoformed plastics. These injection-molded or thermoformed plastics are usually painted in solid colors. Cabinetry inside aircraft lavatories is visible and accessible to passengers within the aircraft.

Cabinetry in aircraft lavatories is desirably accessed only by aircraft personnel. Cabinetry in aircraft lavatories desirably contains consistent, tight gaps between cabinetry panels. Consistent, tight gaps between cabinetry panels create a desirable decorative appearance. Consistent, tight gaps between cabinetry panels may reduce visibility of doors in cabinetry to passengers.

Commercial aircraft are in service for decades. During the course of an aircraft's lifetime, components are replaced during maintenance due to wear or replacement schedules.

Therefore, it would be desirable to have a method and apparatus that take into account at least some of the issues discussed above, as well as other possible issues. It would be desirable to have an improved ability to customize the decorative face of aircraft lavatory cabinets. It would also be desirable to reduce frequency of replacement of components of aircraft lavatory cabinetry.

SUMMARY

An illustrative embodiment of the present disclosure provides an apparatus. The apparatus comprises a composite sandwich panel, a seal, and a hinge. The composite sandwich panel has a first edge in a first over-crush edge region, wherein a thickness of the composite sandwich panel decreases within the first over-crush edge region in a direction towards the first edge. The seal is bonded to the first over-crush edge region of the composite sandwich panel and extending past the first edge. The hinge is connected to the composite sandwich panel such that an axis of rotation of the hinge is positioned over the first over-crush edge region of the composite sandwich panel.

Another illustrative embodiment of the present disclosure provides a method. A seal is bonded to a first over-crush edge region of a composite sandwich panel, wherein a thickness of the composite sandwich panel decreases within the first over-crush edge region in a direction towards a first edge of the composite sandwich panel within the first over-crush edge region. A hinge is connected to the first over-crush edge region of the composite sandwich panel.

Yet another illustrative embodiment of the present disclosure provides an apparatus. The apparatus comprises a composite sandwich panel, a panel, and a hinge. The composite sandwich panel has a cut first edge, a cut second edge, and a cut third edge each with a flat appearance without visible core cells. The seal is bonded to the composite sandwich panel adjacent the cut first edge. The hinge is connected to the composite sandwich panel adjacent the cut first edge.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
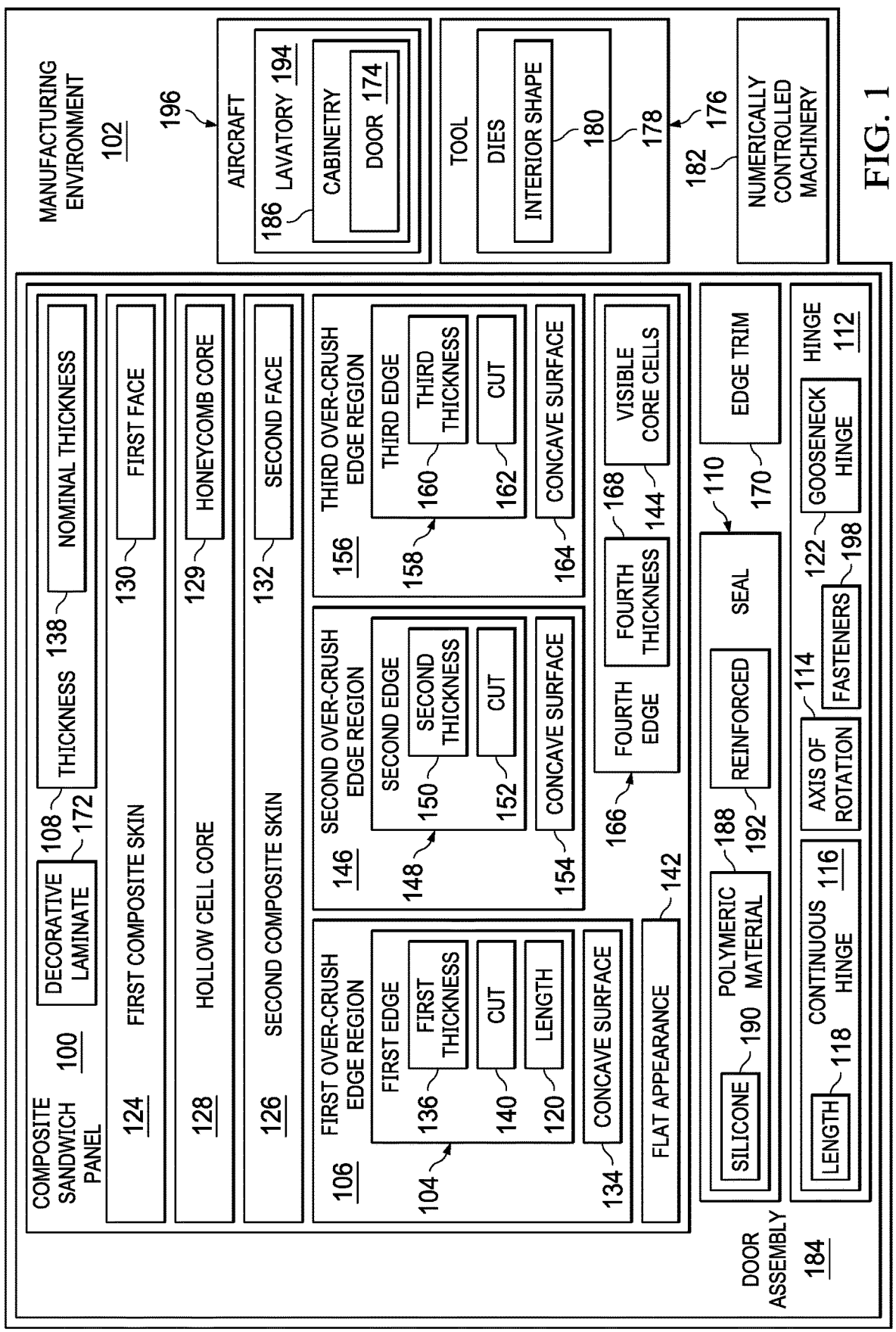
FIG. 1 is an illustration of a block diagram of a manufacturing environment in which composite sandwich panels are used to form a door in accordance with an illustrative embodiment.

The illustrative embodiments recognize and take into account one or more different considerations. For example, the illustrative embodiments recognize and take into account that it is desirable to create cabinetry doors with greater durability to decrease replacement frequency. The illustrative embodiments recognize and take into account that it is desirable to increase the strength of the doors of aircraft lavatory cabinetry. The illustrative embodiments recognize and take into account that it is desirable to decrease the weight of aircraft components. The illustrative embodiments recognize and take into account that it is desirable to maintain straight, tight gaps between door panels in lavatory cabinetry. The illustrative embodiments recognize and take into account that it is desirable to prevent sagging doors in order to maintain straight, tight gaps between door panels in lavatory cabinetry.

The illustrative embodiments recognize and take into account that composite sandwich panels have a high strength to weight ratio. The illustrative embodiments recognize and take into account that to form composite sandwich panels, composite skins are compressed against a hollow cell core. The illustrative embodiments recognize and take into account that conventionally, it is desirable to prevent over-crush of the hollow cell core.

The illustrative embodiments recognize and take into account that cut edges of composite sandwich panels have visible core cells. The illustrative embodiments recognize and take into account that edge trim may be applied to cut edges of composite sandwich panels to cover the visible core cells. The illustrative embodiments recognize and take into account that the edge trim is not considered desirably decorative or desirably durable by aircraft customers. The illustrative embodiments recognize and take into account that the edge trim may cause doors in lavatory cabinetry to be undesirably visible to passengers. The illustrative embodiments recognize and take into account that the presence of edge trims may call a passenger's attention to the fact that there is a door present. The illustrative embodiments recognize and take into account that it is desirable for doors to remain effectively disguised from passengers.

The illustrative embodiments recognize and take into account that the thickness of an edge of a composite sandwich panel affects the size of gaps in lavatory cabinetry. The illustrative embodiments recognize and take into account that increasing the thickness of an edge of a composite sandwich panel increases the size of the gaps in the lavatory cabinetry.

The illustrative examples present an apparatus and method for forming a door comprising a composite sandwich panel. One illustrative embodiment presents an apparatus comprising a composite sandwich panel, a seal, and a hinge. The composite sandwich panel has a first edge in a first over-crush edge region, wherein a thickness of the composite sandwich panel decreases within the first over-crush edge region in a direction towards the first edge. The seal is bonded to the first over-crush edge region of the composite sandwich panel and extending past the first edge. The hinge is connected to the composite sandwich panel such that an axis of rotation of the hinge is positioned over the first over-crush edge region of the composite sandwich panel.

Referring now to the figures and, in particular, with reference to FIG. 1, an illustration of a block diagram of a manufacturing environment in which composite sandwich panels are used to form a door is depicted in accordance with an illustrative embodiment. Composite sandwich panel 100 in manufacturing environment 102 has first edge 104 in first over-crush edge region 106. Thickness 108 of composite sandwich panel 100 decreases within first over-crush edge region 106 in a direction towards first edge 104.

Seal 110 is bonded to first over-crush edge region 106 of composite sandwich panel 100. Seal 110 extends past first edge 104.

Hinge 112 is connected to composite sandwich panel 100 such that axis of rotation 114 of hinge 112 is positioned over first over-crush edge region 106 of composite sandwich panel 100.

In some illustrative examples, seal 110 ends before reaching hinge 112. In some illustrative examples, a portion of seal 110 is sandwiched between hinge 112 and composite sandwich panel 100.

In some illustrative examples, hinge 112 is continuous hinge 116. Continuous hinge 116 may also be referred to as a "piano hinge." In some illustrative examples, continuous hinge 116 has length 118 equivalent to length 120 of first edge 104. In some illustrative examples, hinge 112 is gooseneck hinge 122.

Figure 5:
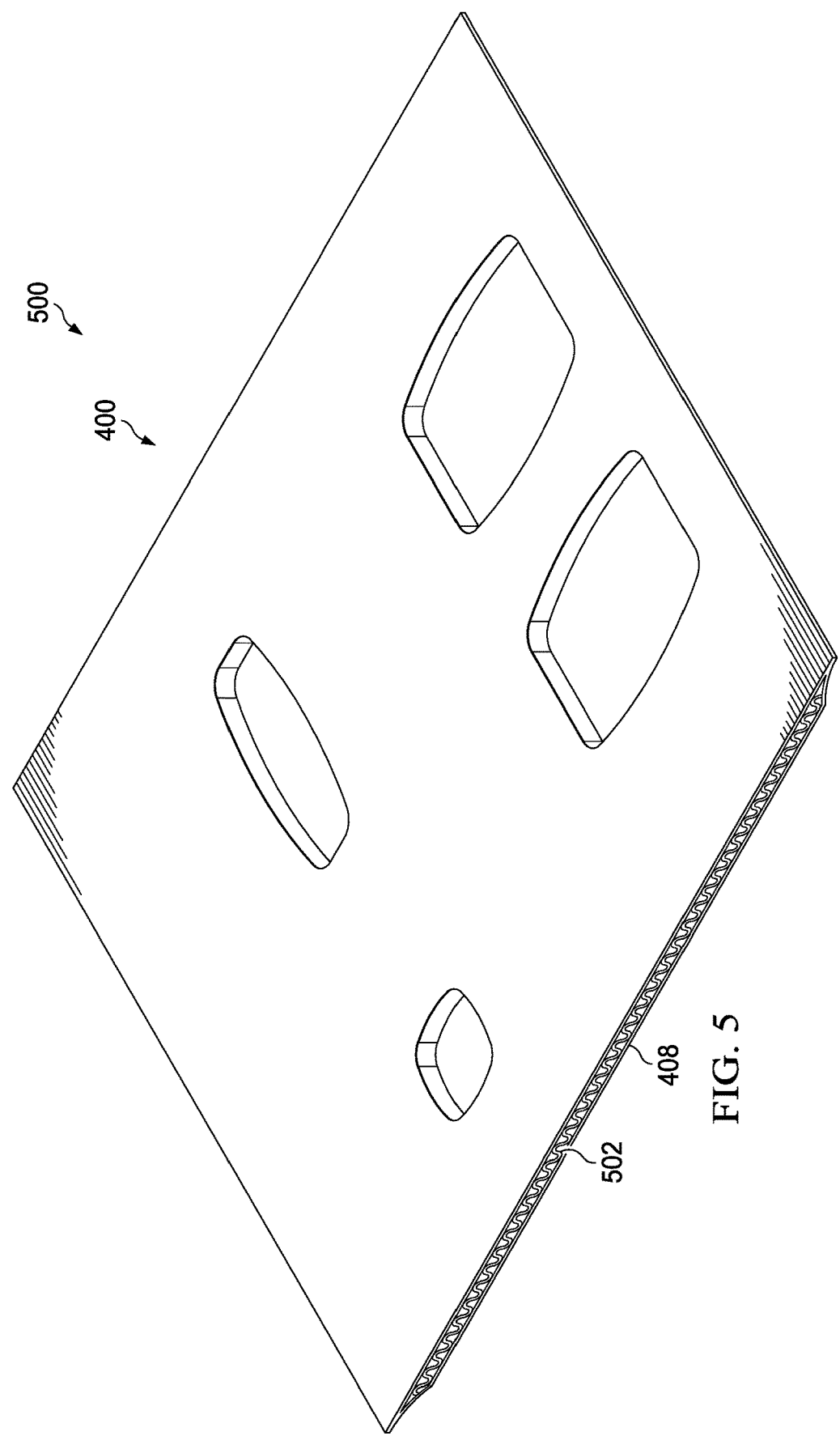
FIG. 5 is an illustration of a back isometric view of a composite sandwich panel in accordance with an illustrative embodiment.

Composite sandwich panel 100 comprises first composite skin 124, second composite skin 126, and hollow cell core 128 between first composite skin 124 and second composite skin 126. First composite skin 124 and second composite skin 126 are compressed against hollow cell core 128 to form composite sandwich panel 100. In some illustrative examples, hollow cell core 128 takes the form of honeycomb core 129. In some illustrative examples, hollow cell core 128 is corrugated as shown in FIG. 5.

Composite sandwich panel 100 has first face 130 and second face 132 opposite first face 130. First face 130 is part of first composite skin 124. Second face 132 is part of second composite skin 126.

In some illustrative examples, second face 132 has concave surface 134 within first over-crush edge region 106. Concave surface 134 may have any desirable shape. In some illustrative examples, concave surface 134 is curved. In some illustrative examples, concave surface 134 is a ramp. In some illustrative examples, concave surface 134 is a combination of straight and curved sections.

First edge 104 of first over-crush edge region 106 has first thickness 136. First thickness 136 is less than nominal thickness 138 of composite sandwich panel 100. Nominal thickness 138 is thickness 108 of composite sandwich panel 100 after consolidation of first composite skin 124, hollow cell core 128, and second composite skin 126 to form composite sandwich panel 100. First thickness 136 is in the range of 40%-15% of nominal thickness 138 of composite sandwich panel 100. In some illustrative examples, first thickness 136 is in the range of 30%-20% of nominal thickness 138 of composite sandwich panel 100. In some illustrative examples, first thickness 136 has an 80% over-crush. In these illustrative examples, first thickness 136 is approximately 20% of nominal thickness 138 of composite sandwich panel 100. In some illustrative examples, nominal thickness 138 may be referred to as an "uncrushed thickness."

First edge 104 is cut 140. Portions of first composite skin 124, hollow cell core 128, and second composite skin 126 are visible at first edge 104. First edge 104 has flat appearance 142 without visible core cells 144.

In some illustrative examples, composite sandwich panel 100 further comprises second over-crush edge region 146. Second over-crush edge region 146 comprises second edge 148 with second thickness 150. Second thickness 150 is less than nominal thickness 138 of composite sandwich panel 100. Second thickness 150 is in the range of 40%-15% of nominal thickness 138 of composite sandwich panel 100. In some illustrative examples, second thickness 150 is in the range of 30%-20% of nominal thickness 138 of composite sandwich panel 100. In some illustrative examples, second thickness 150 has an 80% over-crush. In these illustrative examples, second thickness 150 is approximately 20% of nominal thickness 138 of composite sandwich panel 100.

Second edge 148 is cut 152. Portions of first composite skin 124, hollow cell core 128, and second composite skin 126 are visible at second edge 148. Second edge 148 has flat appearance 142 without visible core cells 144.

In some illustrative examples, second face 132 has concave surface 154 within second over-crush edge region 146. Concave surface 154 may have any desirable shape. In some illustrative examples, concave surface 154 is curved. In some illustrative examples, concave surface 154 is a ramp. In some illustrative examples, concave surface 154 is a combination of straight and curved sections.

In some illustrative examples, composite sandwich panel 100 further comprises third over-crush edge region 156. Third over-crush edge region 156 comprises third edge 158 with third thickness 160. Third thickness 160 is less than nominal thickness 138 of composite sandwich panel 100. Third thickness 160 is in the range of 40%-15% of nominal thickness 138 of composite sandwich panel 100. In some illustrative examples, third thickness 160 is in the range of 30%-20% of nominal thickness 138 of composite sandwich panel 100. In some illustrative examples, third thickness 160 has an 80% over-crush. In these illustrative examples, third thickness 160 is approximately 20% of nominal thickness 138 of composite sandwich panel 100.

Third edge 158 is cut 162. Portions of first composite skin 124, hollow cell core 128, and second composite skin 126 are visible at third edge 158. Third edge 158 has flat appearance 142 without visible core cells 144.

In some illustrative examples, second face 132 has concave surface 164 within third over-crush edge region 156. Concave surface 164 may have any desirable shape. In some illustrative examples, concave surface 164 is curved. In some illustrative examples, concave surface 164 is a ramp. In some illustrative examples, concave surface 164 is a combination of straight and curved sections.

Composite sandwich panel 100 comprises fourth edge 166. Fourth edge 166 has fourth thickness 168. Fourth thickness 168 is substantially the same as nominal thickness 138. Fourth edge 166 has visible core cells 144. In some illustrative examples, edge trim 170 is applied to fourth edge 166 to cover visible core cells 144.

In some illustrative examples, portions of composite sandwich panel 100 are painted. In some illustrative examples, at least one of first face 130, first edge 104, second edge 148, or third edge 158 is painted. In some illustrative examples, composite sandwich panel 100 further comprises decorative laminate 172. In some illustrative examples, decorative laminate 172 covers first face 130 and first edge 104. In some illustrative examples, decorative laminate 172 covers first face 130, first edge 104, second edge 148, and third edge 158.

By forming composite sandwich panel 100 in a crush core press, at least one edge is "over-crushed" to the point that the at least one edge behaves like solid fiberglass. In this illustrative example, each of first edge 104, second edge 148, and third edge 158 is produced using an "over-crush" process. The "over-crush" process uses heat and pressure to compress hollow cell core 128, first composite skin 124, and second composite skin 126 into a solid substrate along each of first edge 104, second edge 148, and third edge 158 of composite sandwich panel 100.

By using this "over-crush" process on first edge 104, second edge 148, and third edge 158, durable edges are created that do not use edge trims. By using this "over-crush" process, door 174 takes advantage of the benefits of a composite sandwich panel having a hollow cell core. In particular, a strength and a stiffness of composite sandwich panel 100 is maintained. Increasing a strength and a stiffness of door 174 results in a more durable product.

Fourth edge 166 of composite sandwich panel 100, which is not over-crushed, allows volatile compounds to escape during the molding process. An injection-molded edge trim, such as edge trim 170, can be applied to fourth edge 166. In some illustrative examples, fourth edge 166 is hidden beneath a countertop where edge trim 170 does not create a decorative concern.

To form composite sandwich panel 100, hollow cell core 128, first composite skin 124, and second composite skin 126 are placed into tool 176 with dies 178. When closed, dies 178 of tool 176 form interior shape 180. Interior shape 180 applies "over-crush" pressure to portions of composite sandwich panel 100 to form first over-crush edge region 106, second over-crush edge region 146, and third over-crush edge region 156.

After performing an "over-crush" process to form composite sandwich panel 100, composite sandwich panel 100 is cut using numerically controlled machinery 182. Numerically controlled machinery 182 is used to form cut 140 first edge 104, cut 152 second edge 148, and cut 162 third edge 158.

In some illustrative examples, composite sandwich panel 100, seal 110, and hinge 112 form door assembly 184. Door assembly 184 is installed into cabinetry to form a door, such as door 174 of cabinetry 186.

Seal 110 is configured to perform desired functions in door assembly 184. Seal 110 is configured to close a gap of door assembly 184 in cabinetry, such as cabinetry 186. In some illustrative examples, seal 110 is formed of polymeric material 188. In some illustrative examples, seal 110 is formed of silicone 190. In some illustrative examples, polymeric material 188 is reinforced 192. Seal 110 is bonded to first over-crush edge region 106 after using numerically controlled machinery 182 used to form cut 140 first edge 104.

After bonding seal 110 to first over-crush edge region 106, hinge 112 is connected to composite sandwich panel 100. In some illustrative examples, hinge 112 is also connected to cabinetry 186 in lavatory 194 of aircraft 196. In some illustrative examples, hinge 112 is connected to composite sandwich panel 100 prior to connecting hinge 112 to cabinetry 186. In some illustrative examples, hinge 112 is connected to cabinetry 186 prior to connecting hinge 112 to composite sandwich panel 100.

Hinge 112 is connected to composite sandwich panel 100 using fasteners 198. In some illustrative examples, prior to connecting hinge 112 to composite sandwich panel 100, drilling and potting steps are performed on composite sandwich panel 100. In these illustrative examples, the drilling and potting steps position fastener receivers. In these illustrative examples, fasteners 198 are connected to fastener receivers in composite sandwich panel 100.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

The illustration of manufacturing environment 102 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 2:
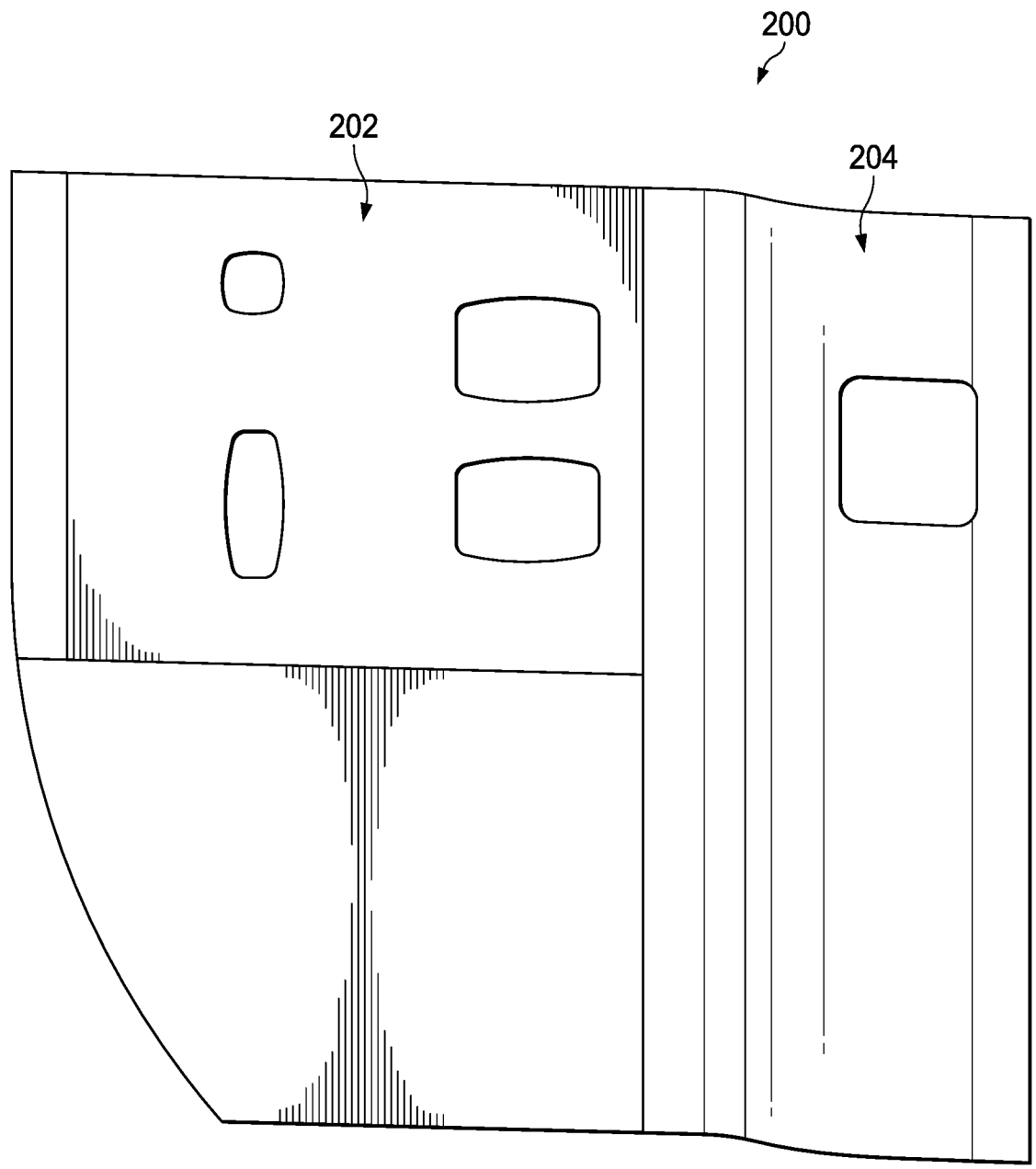
FIG. 2 is an illustration of a front view of a lavatory cabinetry with a door formed of a composite sandwich panel in accordance with an illustrative embodiment.

Turning now to FIG. 2, an illustration of a front view of a lavatory cabinetry with a door formed of a composite sandwich panel is depicted in accordance with an illustrative embodiment. Cabinetry 200 is a physical implementation of cabinetry 186 of FIG. 1.

Cabinetry 200 has door 202 and door 204. Door 202 may be a physical implementation of door 174 of FIG. 1. Door 204 may be a physical implementation of door 174 of FIG. 1.

In some illustrative examples, cabinetry 200 is positioned in lavatory 194 of FIG. 1. In some illustrative examples, cabinetry 200 may be positioned beneath a countertop.

Cabinetry 200 is configured to have desirable durability. Further, cabinetry 200 is designed such that door 202 and door 204 are not obviously doors. Cabinetry 200 is designed such that passengers in an aircraft do not probe door 202 and door 204.

Figure 3:
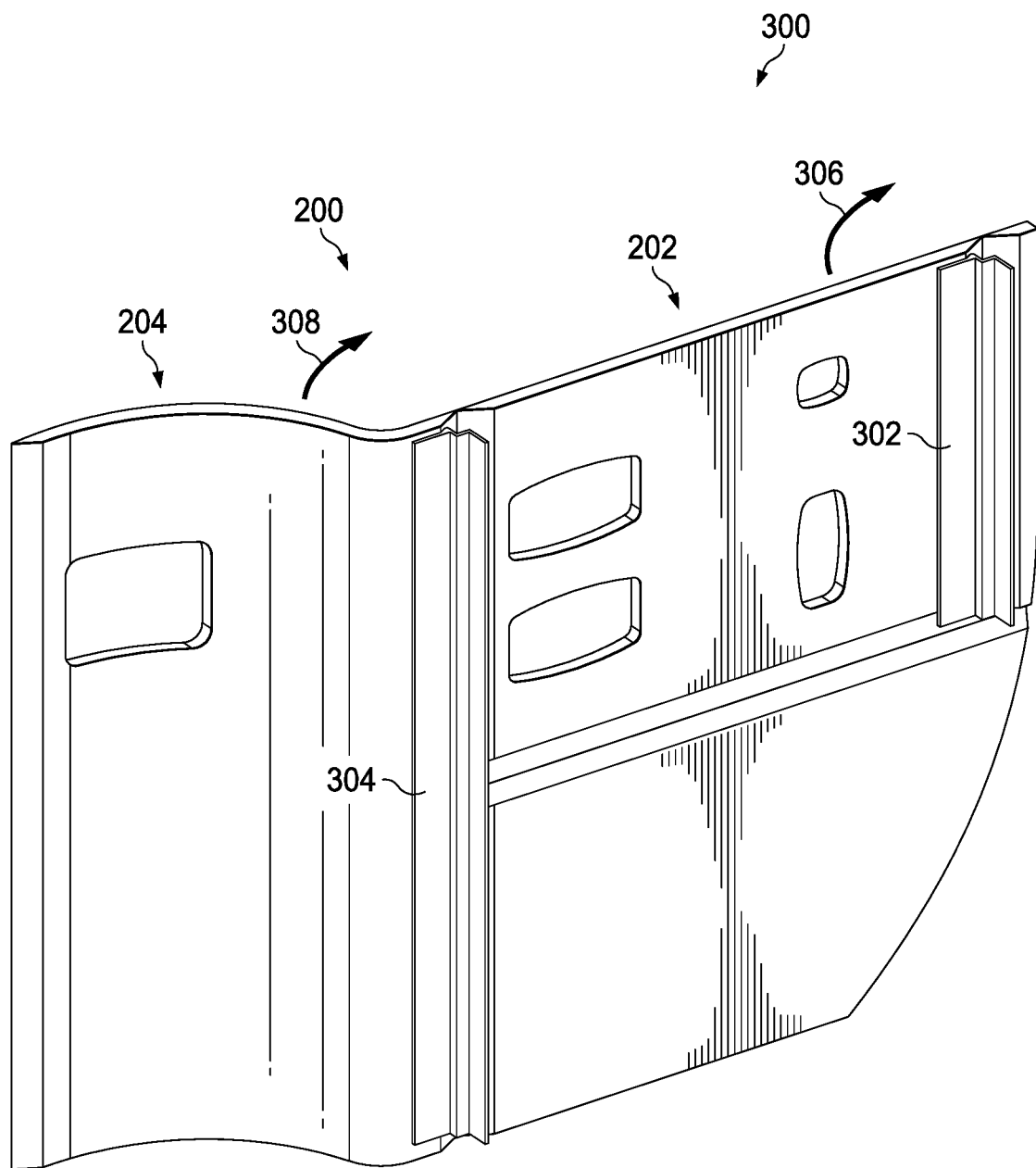
FIG. 3 is an illustration of a back view of a lavatory cabinetry with a door formed of a composite sandwich panel in accordance with an illustrative embodiment.

Turning now to FIG. 3, an illustration of a back view of a lavatory cabinetry with a door formed of a composite sandwich panel is depicted in accordance with an illustrative embodiment. View 300 is a back view of cabinetry 200. As depicted, door 202 is connected to hinge 302. As depicted, door 204 is connected to hinge 304.

Using hinge 302, door 202 opens in direction 306. Using hinge 304, door 204 opens in direction 308.

Figure 4:
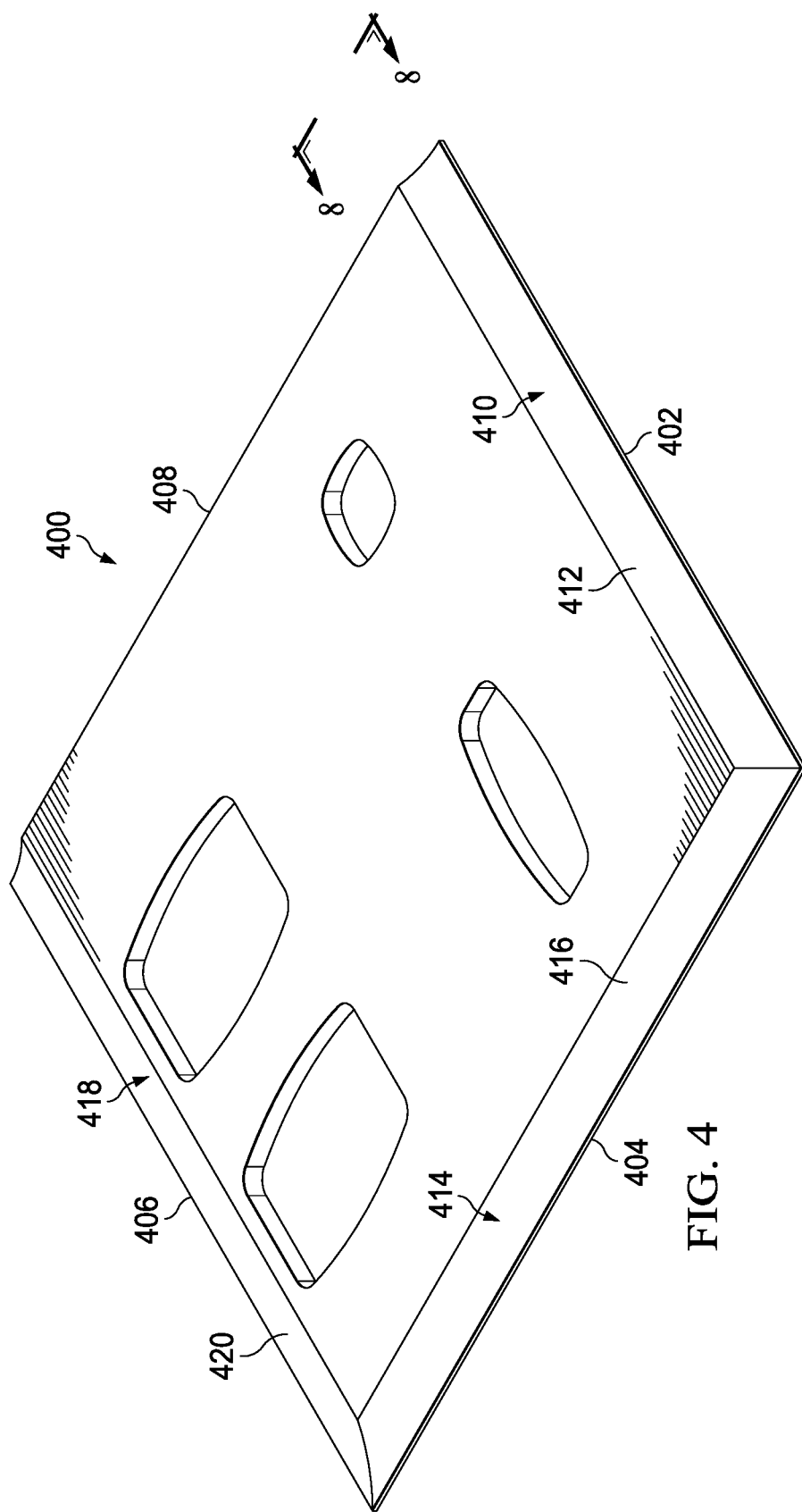
FIG. 4 is an illustration of a front isometric view of a composite sandwich panel in accordance with an illustrative embodiment.

Turning now to FIG. 4, an illustration of a front isometric view of a composite sandwich panel is depicted in accordance with an illustrative embodiment. Composite sandwich panel 400 is a physical implementation of composite sandwich panel 100 of FIG. 1. In some illustrative examples, composite sandwich panel 400 is a component of door 202 of FIG. 2.

As depicted, composite sandwich panel 400 has first edge 402, second edge 404, third edge 406, and fourth edge 408. Each of first edge 402, second edge 404, and third edge 406 has a flat appearance without visible core cells. First edge 402 is in first over-crush edge region 410. First over-crush edge region 410 has concave surface 412.

Second edge 404 is in second over-crush edge region 414. Second over-crush edge region 414 has concave surface 416. Third edge 406 is in third over-crush edge region 418. Third over-crush edge region 418 has concave surface 420.

Turning now to FIG. 5, an illustration of a back isometric view of a composite sandwich panel is depicted in accordance with an illustrative embodiment. View 500 is a back isometric view of composite sandwich panel 400 from fourth edge 408.

As depicted, fourth edge 408 has visible core cells 502. In some illustrative examples, prior to being placed into service, an edge treatment will be applied to fourth edge 408. In some illustrative examples, prior to being placed into service, an edge trim is adhered to fourth edge 408.

Figure 6:
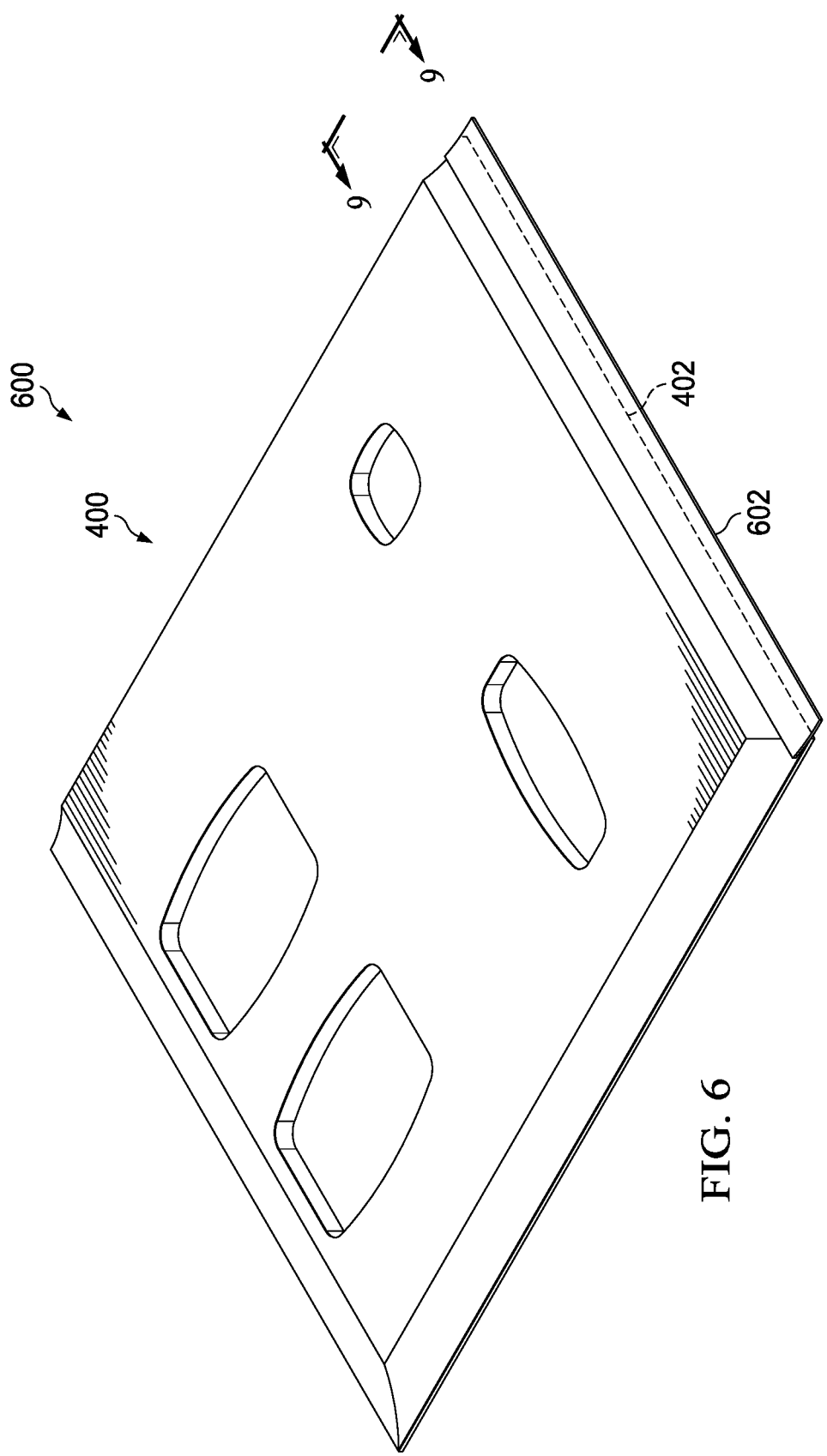
FIG. 6 is an illustration of a front isometric view of a composite sandwich panel with a seal in accordance with an illustrative embodiment.

Turning now to FIG. 6, an illustration of a front isometric view of a composite sandwich panel with a seal is depicted in accordance with an illustrative embodiment. In view 600, seal 602 has been bonded to first over-crush edge region 410. Seal 602 extends past first edge 402. Seal 602 is a physical implementation of seal 110 of FIG. 1.

Seal 602 is formed of any desirable material. In some illustrative examples, seal 602 is formed of a polymeric material. In some illustrative examples, seal 602 is formed of a reinforced material.

Figure 7:
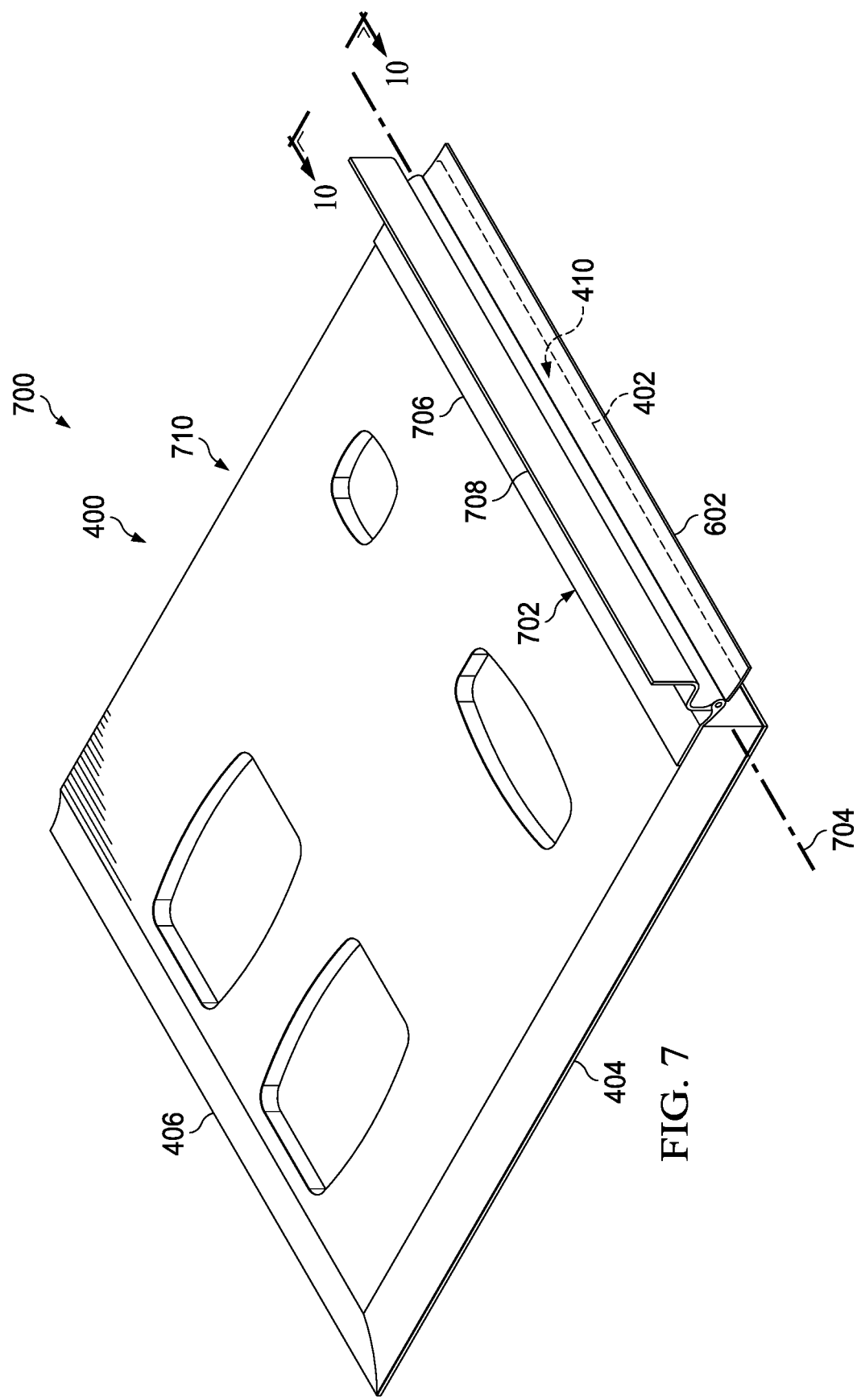
FIG. 7 is an illustration of a front isometric view of a composite sandwich panel with a seal and a hinge in accordance with an illustrative embodiment.

Turning now to FIG. 7, an illustration of a front isometric view of a composite sandwich panel with a seal and a hinge is depicted in accordance with an illustrative embodiment. In view 700, hinge 702 has been connected to composite sandwich panel 400 such that axis of rotation 704 of hinge 702 is positioned over first over-crush edge region 410 of composite sandwich panel 400. As depicted, hinge 702 is continuous hinge 706. As depicted, hinge 702 is gooseneck hinge 708.

In some illustrative examples, composite sandwich panel 400, seal 602, and hinge 702 are referred to as door assembly 710. Composite sandwich panel 400 has cut first edge 402, cut second edge 404, and cut third edge 406 each with a flat appearance without visible core cells. As depicted, seal 602 is bonded to composite sandwich panel 400 adjacent cut first edge 402. Hinge 702 is connected to composite sandwich panel 400 adjacent cut first edge 402.

As depicted, cut first edge 402 is within first over-crush edge region 410 of composite sandwich panel 400, wherein seal 602 is bonded to first over-crush edge region 410. As depicted, hinge 702 is connected to composite sandwich panel 400 such that an axis of rotation of hinge 702 is positioned over first over-crush edge region 410.

Figure 8:
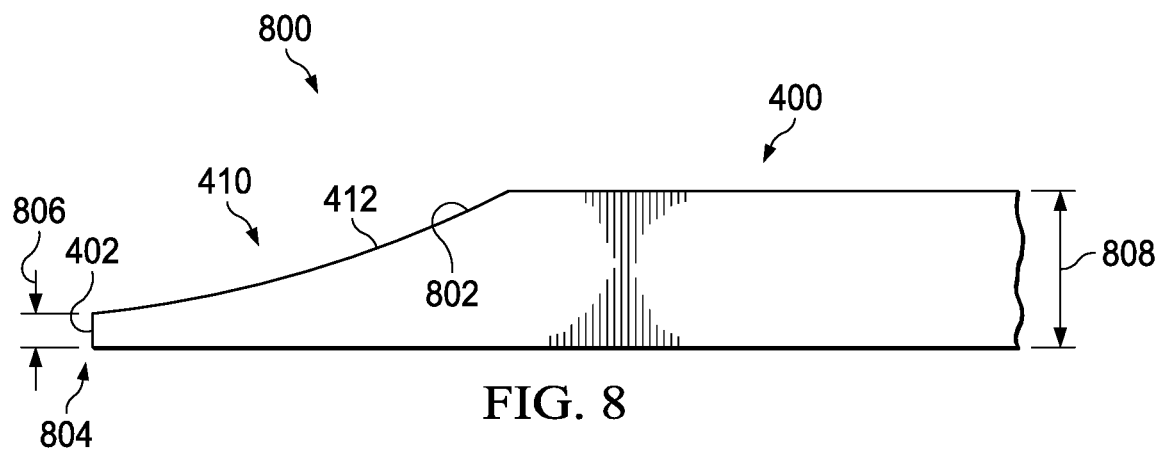
FIG. 8 is an illustration of a side view of a composite sandwich panel in accordance with an illustrative embodiment.

Turning now to FIG. 8, an illustration of a side view of a composite sandwich panel is depicted in accordance with an illustrative embodiment. View 800 is a side view of first over-crush edge region 410 of composite sandwich panel 400.

As depicted, concave surface 412 of first over-crush edge region 410 is curved 802. As depicted, first edge 402 is cut 804. Thickness 806 of first edge 402 is considerably less than nominal thickness 808 of composite sandwich panel 400.

Figure 9:
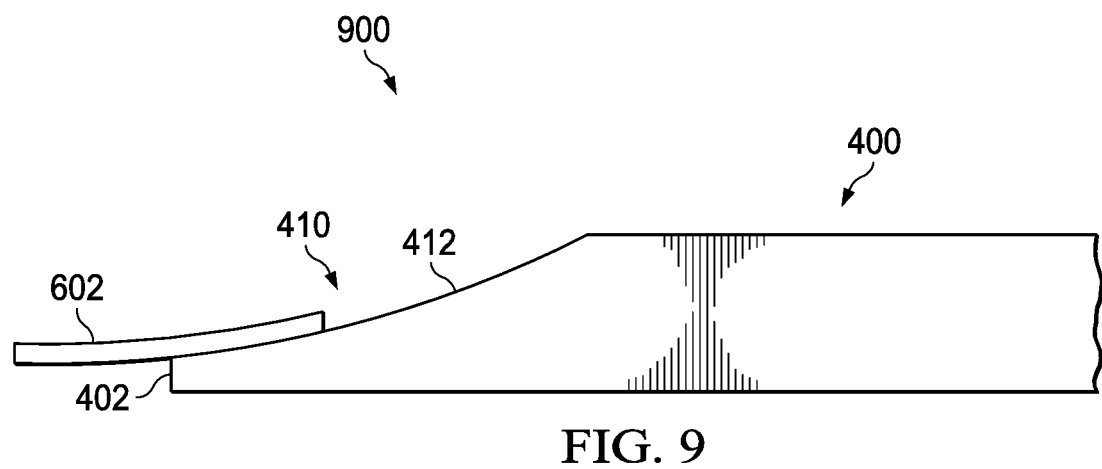
FIG. 9 is an illustration of a side view of a composite sandwich panel with a seal in accordance with an illustrative embodiment.

Turning now to FIG. 9, an illustration of a side view of a composite sandwich panel with a seal is depicted in accordance with an illustrative embodiment. View 900 is a side view of first over-crush edge region 410 of composite sandwich panel 400 with seal 602. As depicted, seal 602 extends over first edge 402. As depicted, seal 602 stops within first over-crush edge region 410.

Figure 10:
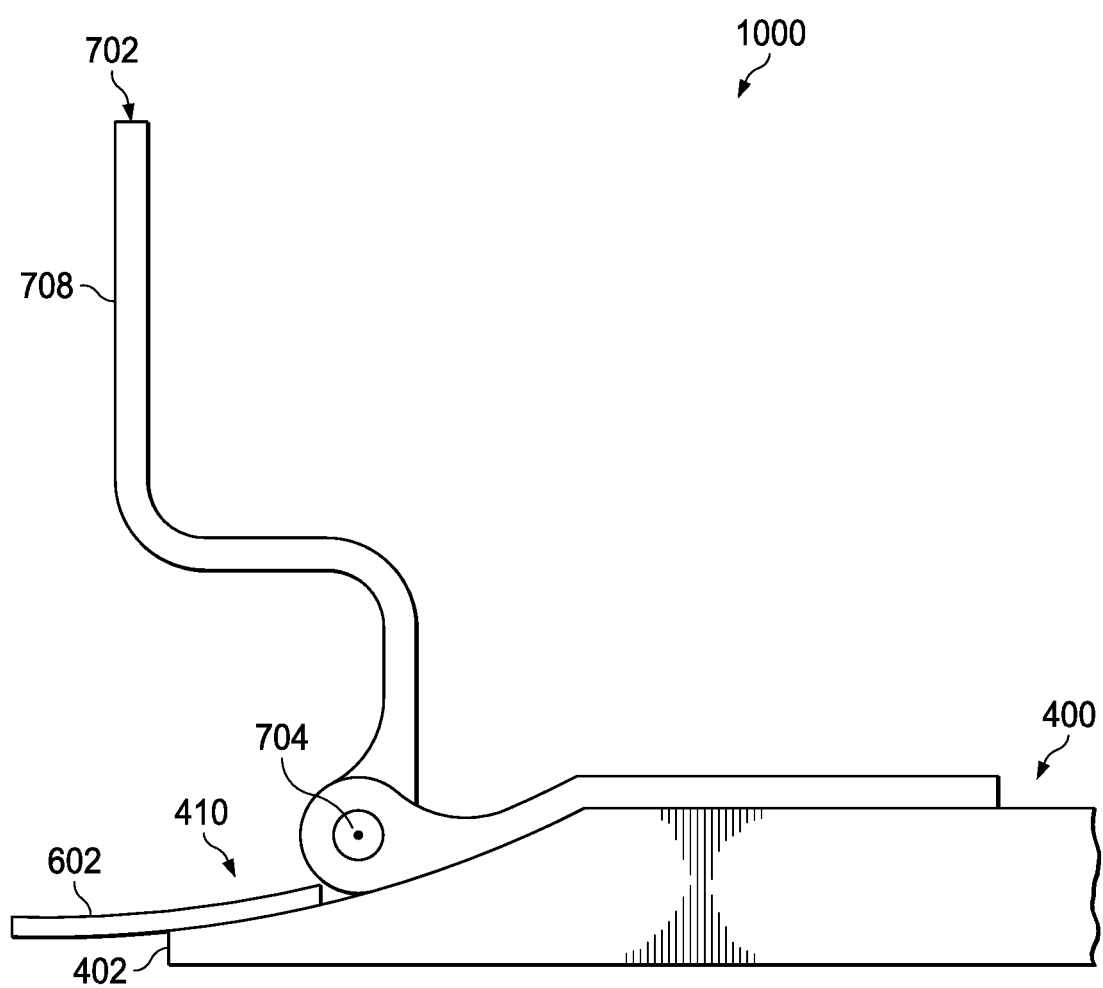
FIG. 10 is an illustration of a side view of a composite sandwich panel with a seal and a hinge in accordance with an illustrative embodiment.

Turning now to FIG. 10, an illustration of a side view of a composite sandwich panel with a seal and a hinge is depicted in accordance with an illustrative embodiment. View 1000 is a side view of first over-crush edge region 410 of composite sandwich panel 400 with seal 602 and hinge 702. Hinge 702 has been connected to composite sandwich panel 400 such that axis of rotation 704 of hinge 702 is positioned over first over-crush edge region 410 of composite sandwich panel 400. As depicted, hinge 702 is gooseneck hinge 708. As depicted, seal 602 ends prior to hinge 702.

Figure 11:
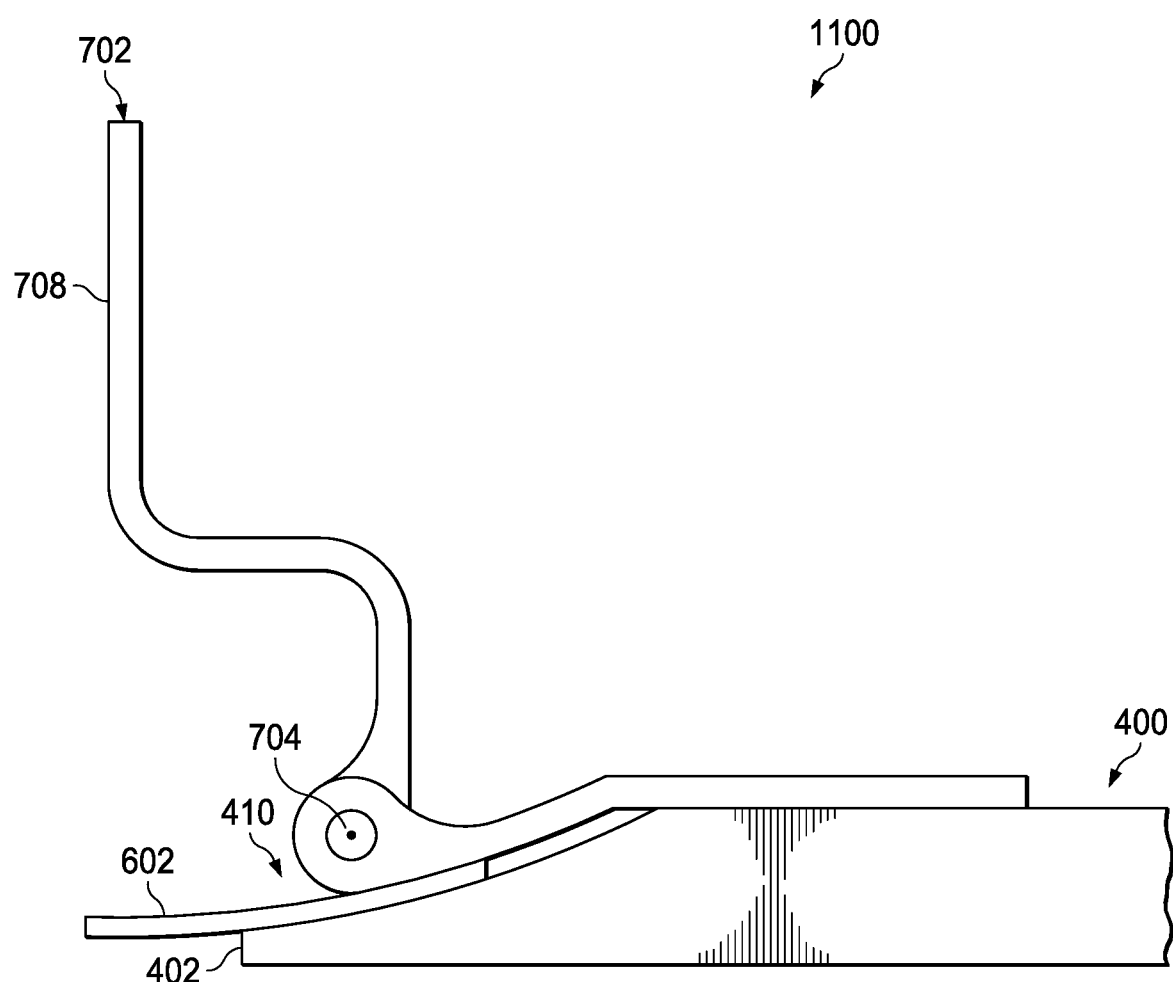
FIG. 11 is another illustration of a side view of a composite sandwich panel with a seal and a hinge in accordance with an illustrative embodiment.

Turning now to FIG. 11, another illustration of a side view of a composite sandwich panel with a seal and a hinge is depicted in accordance with an illustrative embodiment. View 1100 is a side view of first over-crush edge region 410 of composite sandwich panel 400 with seal 602 and hinge 702. Hinge 702 has been connected to composite sandwich panel 400 such that axis of rotation 704 of hinge 702 is positioned over first over-crush edge region 410 of composite sandwich panel 400. As depicted, hinge 702 is gooseneck hinge 708. As depicted, a portion of seal 602 is sandwiched between hinge 702 and composite sandwich panel 400.

Figure 12:
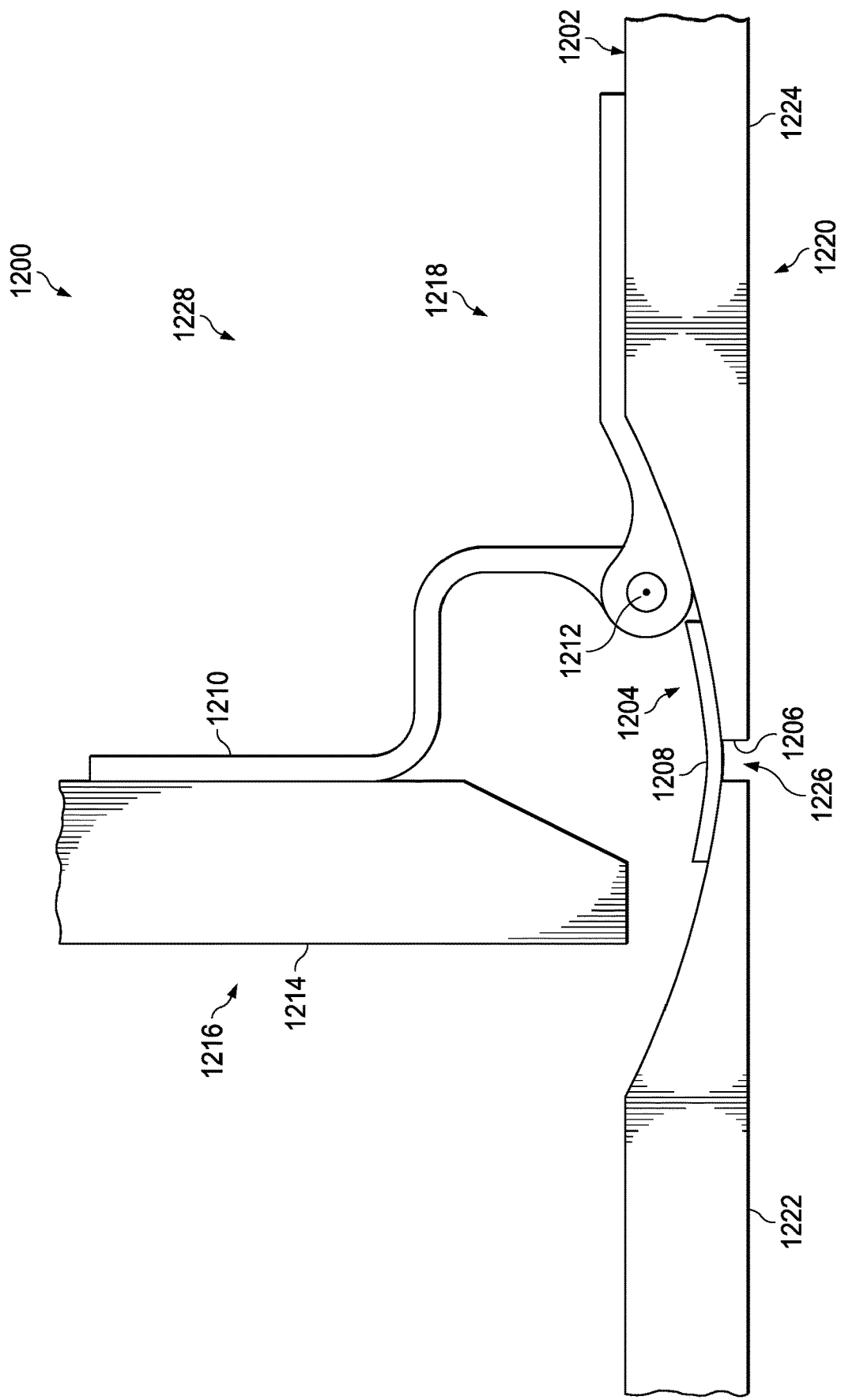
FIG. 12 is an illustration of a side view of a composite sandwich panel with a seal and a hinge installed in cabinetry and in a closed position in accordance with an illustrative embodiment.

Turning now to FIG. 12, an illustration of a side view of a composite sandwich panel with a seal and a hinge installed in cabinetry and in a closed position is depicted in accordance with an illustrative embodiment. View 1200 is a side view of composite sandwich panel 1202. Composite sandwich panel 1202 is a physical implementation of composite sandwich panel 100 of FIG. 1. Composite sandwich panel 1202 may be composite sandwich panel 400 of FIGS. 4-11. In some illustrative examples, composite sandwich panel 1202 is a component of one of door 202 or door 204.

As depicted, composite sandwich panel 1202 has first over-crush edge region 1204 with first edge 1206. Seal 1208 is bonded to first over-crush edge region 1204. Hinge 1210 is connected to composite sandwich panel 1202 such that axis of rotation 1212 is positioned over first over-crush edge region 1204.

Hinge 1210 is also connected to supporting structure 1214 of cabinetry 1216. Door assembly 1218 including composite sandwich panel 1202, seal 1208, and hinge 1210 is in closed position 1220. Connecting hinge 1210 to cabinetry 1216 forms a composite door, such as door 202 or door 204 of FIG. 2. In closed position 1220, seal 1208 contacts facing 1222. In closed position 1220, first face 1224 is substantially flush with facing 1222. Seal 1208 seals gap 1226 between composite sandwich panel 1202 and facing 1222. Seal 1208 deters entry of water or other contaminates to interior 1228 of cabinetry 1216.

For an acceptable appearance, consistent, tight gaps are desirable between panels. Gaps are desirably closed out while not sacrificing a decorative appearance. When a decorative laminate is applied to composite sandwich panel 1202, seal 1208 can be colored to match the decorative laminate. Seal 1208 is configured to close out any gaps with a consistent appearance.

Figure 13:
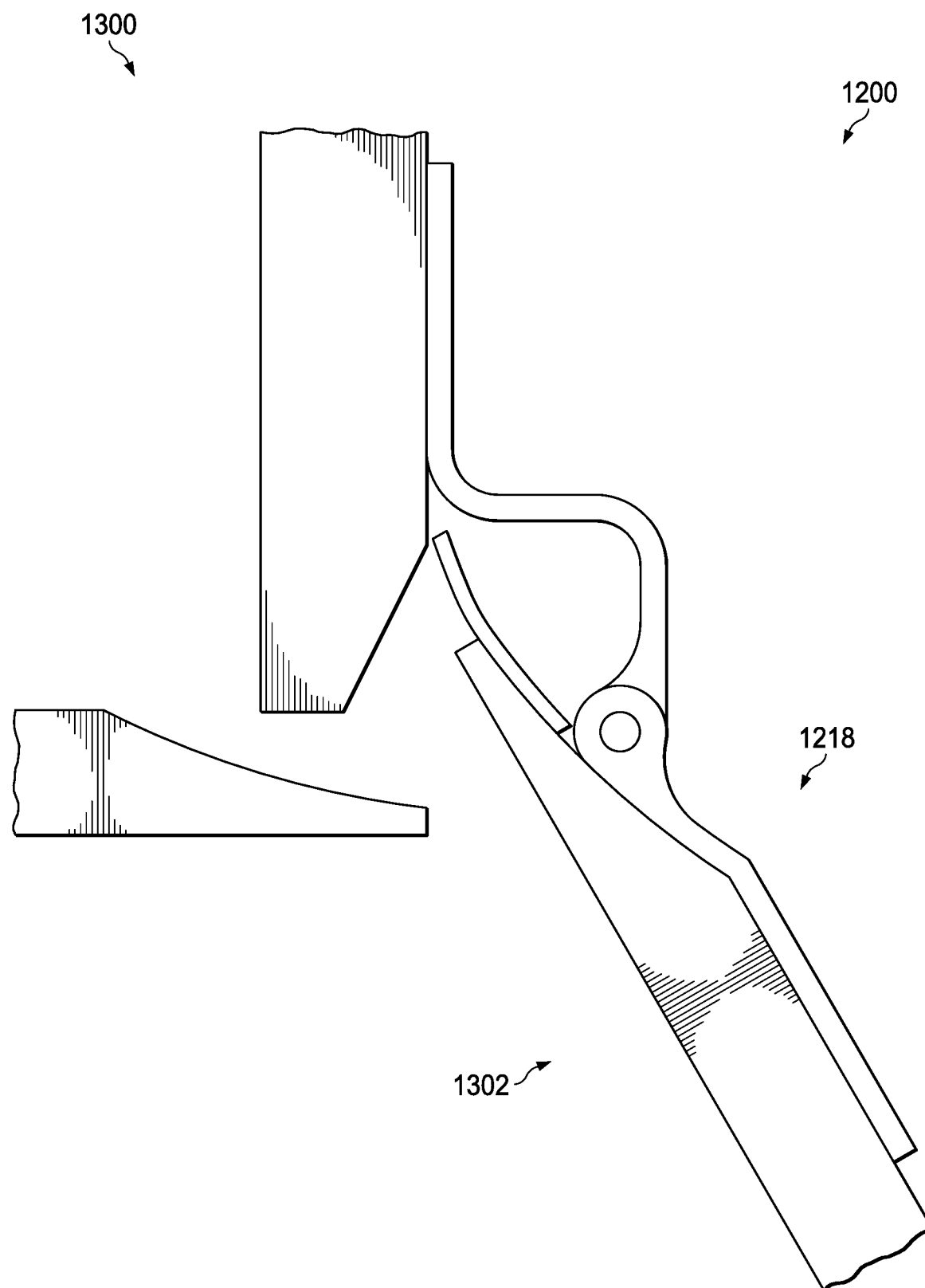
FIG. 13 is an illustration of a side view of a composite sandwich panel with a seal and a hinge installed in cabinetry and in an open position in accordance with an illustrative embodiment.

Turning now to FIG. 13, an illustration of a side view of a composite sandwich panel with a seal and a hinge installed in cabinetry and in an open position is depicted in accordance with an illustrative embodiment. View 1300 is a side view of composite sandwich panel 1202. In view 1300, door assembly 1218 is in open position 1302.

Figure 14:
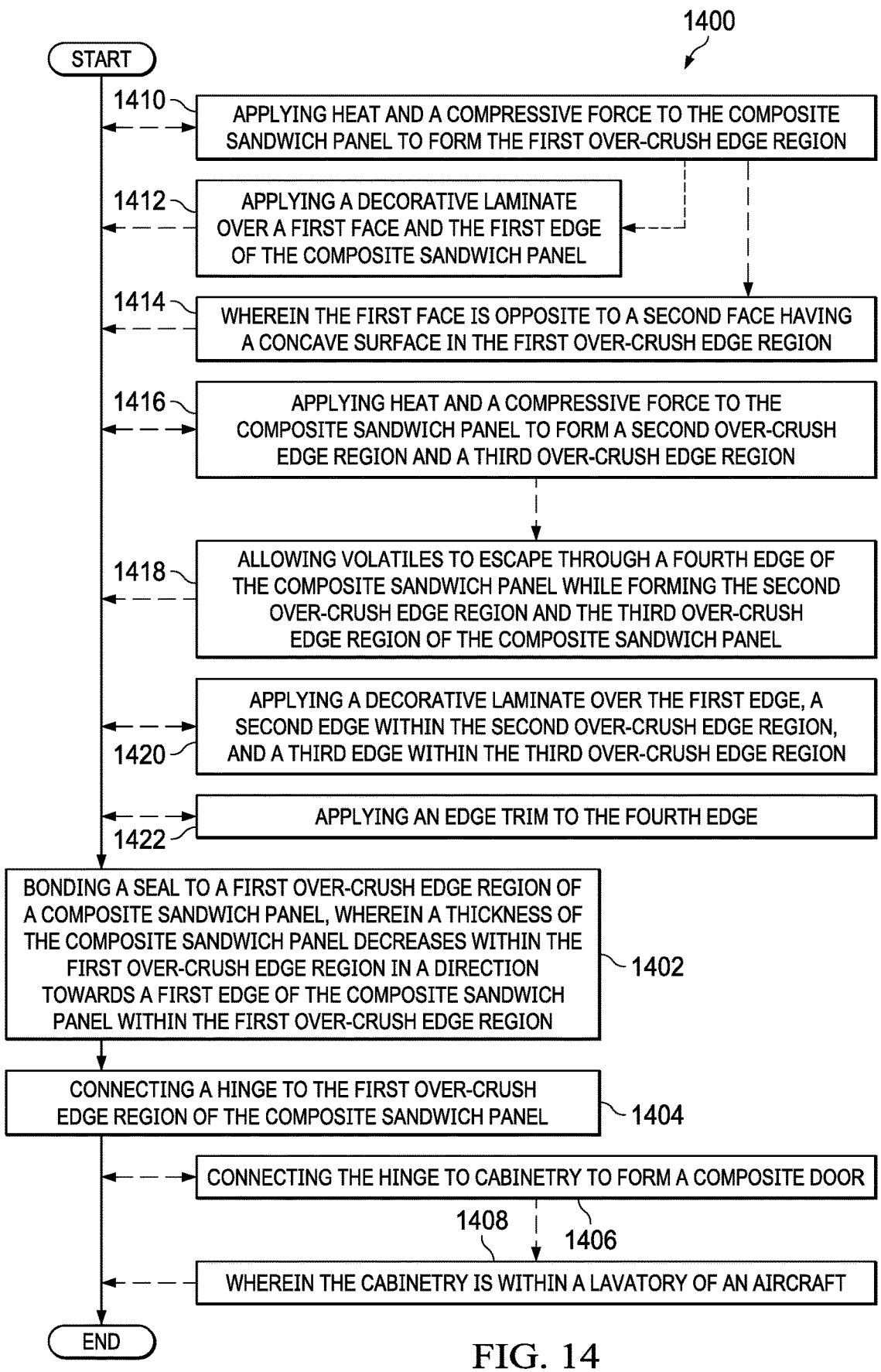
FIG. 14 is an illustration of a flowchart of a method for forming and using a composite sandwich panel in accordance with an illustrative embodiment.

Turning now to FIG. 14, an illustration of a flowchart of a method for forming and using a composite sandwich panel is depicted in accordance with an illustrative embodiment. Method 1400 may be used to form door assembly 184 of FIG. 1 or door assembly 1218 of FIG. 12. Method 1400 may be used to form any of composite sandwich panel 100 of FIG. 1, composite sandwich panel 400 of FIG. 2, or composite sandwich panel 1202 of FIG. 12.

Method 1400 bonds a seal to a first over-crush edge region of a composite sandwich panel, wherein a thickness of the composite sandwich panel decreases within the first over-crush edge region in a direction towards a first edge of the composite sandwich panel within the first over-crush edge region (operation 1402). Method 1400 connects a hinge to the first over-crush edge region of the composite sandwich panel (operation 1404). Afterwards, the method terminates.

In some illustrative examples, method 1400 also connects the hinge to cabinetry to form a composite door (operation 1406). In some illustrative examples, the cabinetry is within a lavatory of an aircraft (operation 1408).

In some illustrative examples, method 1400 applies heat and a compressive force to the composite sandwich panel to form the first over-crush edge region (operation 1410). In some illustrative examples, method 1400 applies a decorative laminate over a first face and the first edge of the composite sandwich panel (operation 1412).

In some illustrative examples, the first face is opposite to a second face having a concave surface in the first over-crush edge region (operation 1414). In some illustrative examples, method 1400 applies heat and a compressive force to the composite sandwich panel to form a second over-crush edge region and a third over-crush edge region (operation 1416).

In some illustrative examples, method 1400 allows volatiles to escape through a fourth edge of the composite sandwich panel while forming the second over-crush edge region and the third over-crush edge region of the composite sandwich panel (operation 1418). In some illustrative examples, method 1400 applies a decorative laminate over the first edge, a second edge within the second over-crush edge region, and a third edge within the third over-crush edge region (operation 1420). In some illustrative examples, method 1400 applies an edge trim to the fourth edge (operation 1422).

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

In some illustrative examples, not all blocks of method 1400 are performed. For example, operations 1406 through 1422 are optional.

Figure 15:
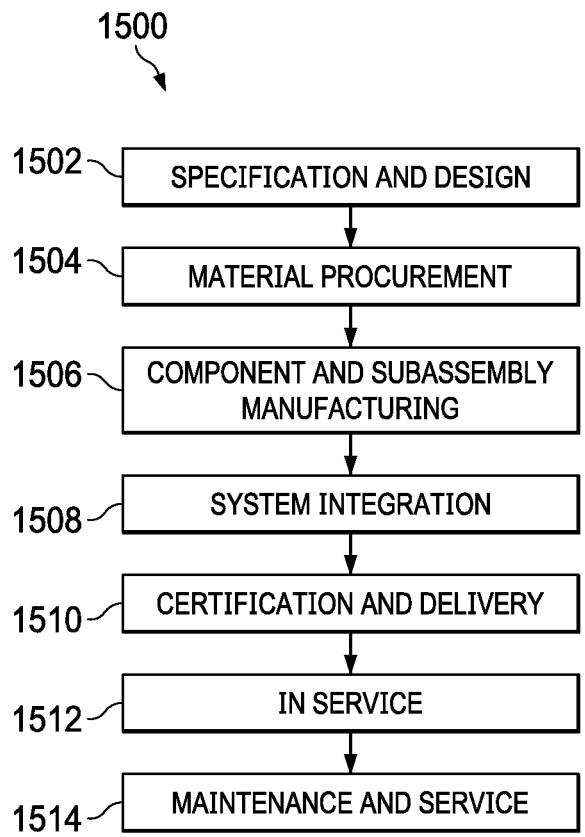
FIG. 15 is an illustration of an aircraft manufacturing and service method in the form of a block diagram in accordance with an illustrative embodiment.
Figure 16:
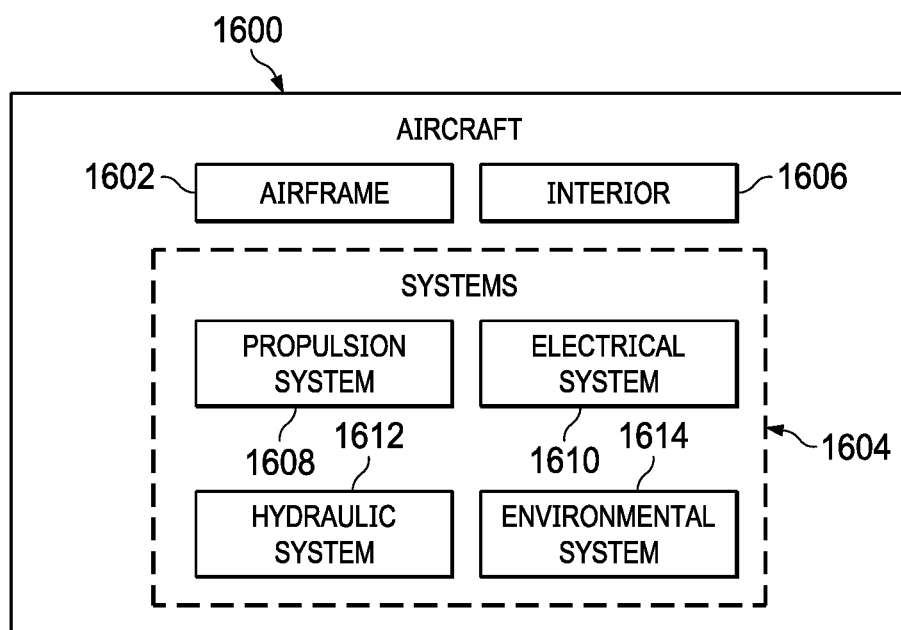
FIG. 16 is an illustration of an aircraft in the form of a block diagram in which an illustrative embodiment may be implemented.

The illustrative embodiments of the present disclosure may be described in the context of aircraft manufacturing and service method 1500 as shown in FIG. 15 and aircraft 1600 as shown in FIG. 16. Turning first to FIG. 15, an illustration of an aircraft manufacturing and service method is depicted in accordance with an illustrative embodiment. During pre-production, aircraft manufacturing and service method 1500 may include specification and design 1502 of aircraft 1600 in FIG. 16 and material procurement 1504.

During production, component and subassembly manufacturing 1506 and system integration 1508 of aircraft 1600 takes place. Thereafter, aircraft 1600 may go through certification and delivery 1510 in order to be placed in service 1512. While in service 1512 by a customer, aircraft 1600 is scheduled for routine maintenance and service 1514, which may include modification, reconfiguration, refurbishment, and other maintenance or service.

Each of the processes of aircraft manufacturing and service method 1500 may be performed or carried out by a system integrator, a third party, and/or an operator. In these examples, the operator may be a customer. For the purposes of this description, a system integrator may include, without limitation, any number of aircraft manufacturers or major-system subcontractors; a third party may include, without limitation, any number of vendors, subcontractors, or suppliers; and an operator may be an airline, a leasing company, a military entity, a service organization, and so on.

With reference now to FIG. 16, an illustration of an aircraft is depicted in which an illustrative embodiment may be implemented. In this example, aircraft 1600 is produced by aircraft manufacturing and service method 1500 in FIG. 15 and may include airframe 1602 with a plurality of systems 1604 and interior 1606. Examples of systems 1604 include one or more of propulsion system 1608, electrical system 1610, hydraulic system 1612, and environmental system 1614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1500. One or more illustrative embodiments may be used during component and subassembly manufacturing 1506, system integration 1508, or maintenance and service 1514 of FIG. 15. For example, door assembly 184 including composite sandwich panel 100 may assembled during component and subassembly manufacturing 1506. As another example, door assembly 184 including composite sandwich panel 100 may be a replacement part during maintenance and service 1514 of FIG. 15.

Apparatuses and methods embodied herein may be employed in manufacturing at least one component of aircraft 1600. For example, composite sandwich panel 100 of FIG. 1 may be manufactured to form a portion of interior 1606.

The illustrative examples present methods and apparatuses to use composite sandwich panels, including fiberglass panels, in lieu of standard thermoplastic doors. The illustrative examples present crushed core fiberglass door panels to be used in cabinetry. In some illustrative examples, the cabinetry may be present in the lavatory of an aircraft.

As presented, the over-crushed door panels can be painted. It is also possible to apply decorative laminates to the decorative surfaces of the over-crushed door panels. The decorative laminate can be wrapped around the three crushed edges for a seamless appearance.

The use of these over-crushed door panels may increase durability and aesthetics. It is desirable to maintain consistent, tight gaps between panels. It is also desirable to close out gaps while not sacrificing a decorative appearance.

By bonding a flap seal to the over-crushed edges of the panel, the gaps are closed out. The seal can be colored to match the decorative laminate applied to the panel, and the seal closes out any gaps with a consistent appearance.

In addition to the flap seal, a new type of continuous (piano) hinge has been created that allows the hinge side of the door to retract into the compartment, which allows the flap seals to avoid interference. The hinge design allows the seal to stay behind the door panel, and closes tightly when the door is closed. The use of a continuous hinge increases durability and reduces sagging. The hinge design maintains straight, tight gaps between door panels.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a composite sandwich panel having an edge in an over-crush edge region, wherein a thickness of the composite sandwich panel decreases within the over-crush edge region in a direction towards the edge;
a seal bonded to the over-crush edge region of the composite sandwich panel and extending past the edge; and
a continuous hinge connected to the composite sandwich panel such that an axis of rotation of the continuous hinge is positioned over the over-crush edge region of the composite sandwich panel, wherein:
the composite sandwich panel comprises a first face and a second face opposite the first face; and
the second face has a concave surface disposed in the over-crush edge region.

2. The apparatus of claim 1, wherein the continuous hinge has a length equivalent to a length of the edge.

3. The apparatus of claim 1, wherein the continuous hinge is a gooseneck hinge.

4. The apparatus of claim 1, wherein the composite sandwich panel further comprises a decorative laminate covering the first face and the edge.

5. The apparatus of claim 1, wherein:
the over-crush edge region comprises a first over-crush edge region;
the edge comprises a first edge; and
the composite sandwich panel further comprises:
a second over-crush edge region with a second edge; and
a third over-crush edge region with a third edge.

6. The apparatus of claim 1, wherein a door assembly comprises the composite sandwich panel, the seal, and the continuous hinge.

7. The apparatus of claim 1, wherein the continuous hinge is connected to cabinetry in a lavatory of an aircraft.

8. The apparatus of claim 1, wherein a portion of the seal is sandwiched between the continuous hinge and the composite sandwich panel.

9. The apparatus of claim 1, wherein the edge in the over-crush edge region has a thickness in a range of 40%-15% of a nominal thickness of the composite sandwich panel.

10. The apparatus of claim 1, wherein the composite sandwich panel comprises a first composite skin, a second composite skin, and a hollow cell core between the first composite skin and the second composite skin.

11. The apparatus of claim 1, wherein the edge has a flat appearance without visible core cells.

12. An apparatus that comprises:
a composite sandwich panel having a cut first edge, a cut second edge, and a cut third edge each with a flat appearance without visible core cells;

a seal bonded to the composite sandwich panel adjacent the cut first edge; and a hinge connected to the composite sandwich panel adjacent the cut first edge, wherein:
- a portion of the seal is sandwiched between the hinge and the composite sandwich panel;
- the composite sandwich panel comprises a first face opposite a second face; and
- the second face has a concave surface disposed in an over-crush edge region, such that:
  - the cut first edge is within the over-crush edge region of the composite sandwich panel;
  - the seal is bonded to the over-crush edge region; and
  - the hinge is connected to the composite sandwich panel such that an axis of rotation of the hinge is positioned over the over-crush edge region.

13. The apparatus of claim 12, wherein the hinge comprises a continuous hinge that comprises a length equivalent to a length of the cut first edge.

14. An apparatus comprising:
a composite sandwich panel having a first edge in a first over-crush edge region, wherein a thickness of the composite sandwich panel decreases within the first over-crush edge region in a direction towards the first edge;
a seal bonded to the first over-crush edge region of the composite sandwich panel and extending past the first edge; and
a continuous hinge connected to the composite sandwich panel such that an axis of rotation of the continuous hinge is positioned over the first over-crush edge region of the composite sandwich panel, wherein:
- the composite sandwich panel has a first face and a second face opposite the first face;
- the second face has a concave surface within the first over-crush edge region; and
- the composite sandwich panel further comprises a second over-crush edge region with a second edge, and a third over-crush edge region with a third edge.

15. The apparatus of claim 14, wherein the continuous hinge has a length equivalent to a length of the first edge.

16. The apparatus of claim 14, wherein the continuous hinge is a gooseneck hinge.

17. The apparatus of claim 14, wherein the composite sandwich panel further comprises a decorative laminate covering the first face and the first edge.

18. The apparatus of claim 14, wherein a door assembly comprises the composite sandwich panel, the seal, and the continuous hinge.

19. The apparatus of claim 14, wherein the continuous hinge is connected to cabinetry in a lavatory of an aircraft.

20. The apparatus of claim 14, wherein the first edge in the first over-crush edge region has a thickness in a range of about 40%-15% of a nominal thickness of the composite sandwich panel.

* * * * *